United States Patent [19]

Kirkwood

[11] 3,711,062

[45] Jan. 16, 1973

[54] EXPANDABLE SEAL GATE VALVE

[76] Inventor: Creal E. Kirkwood, 1423 South 103rd East Avenue, Tulsa, Okla.

[22] Filed: Nov. 2, 1970

[21] Appl. No.: 86,114

[52] U.S. Cl. ................... 251/172, 251/171, 277/34.3
[51] Int. Cl. ............................................. F16k 25/00
[58] Field of Search ...... 251/171, 172, 159; 277/34.3

[56] References Cited

UNITED STATES PATENTS

| 3,475,004 | 10/1969 | Jennings | 251/172 X |
| 3,337,222 | 8/1967 | Smith | 277/34.3 |
| 2,299,734 | 10/1942 | Betts | 277/34.3 X |
| 2,401,108 | 5/1946 | Roberts | 277/34.3 |

FOREIGN PATENTS OR APPLICATIONS

| 851,732 | 10/1960 | Great Britain | 251/172 |
| 1,338,381 | 8/1963 | France | 251/172 |
| 520,188 | 3/1931 | Germany | 251/172 |

Primary Examiner—Harold W. Weakley
Attorney—Head & Johnson

[57] ABSTRACT

Improved means for effecting sealing between the body sealing surface and the gate member of a valve in which the gate member is positionable against a body sealing surface, the body sealing surface having an annular groove therein, the improvement including expandable gasket means positioned in the annular groove, a pressure passageway in the body communicating the expandable gasket means to the exterior of the valve body, and means exterior of the valve body for applying hydraulic pressure to expand the expandable gasket means into sealing contact with the gate member.

2 Claims, 8 Drawing Figures

PATENTED JAN 16 1973

INVENTOR.
CREAL E KIRKWOOD

BY Head & Johnson

ATTORNEYS

INVENTOR.
CREAL E. KIRKWOOD
BY Head & Johnson
ATTORNEYS 3,711,062

EXPANDABLE SEAL GATE VALVE

BACKGROUND, SUMMARY AND OBJECTS OF THE INVENTION

Gate valves are well known devices in industry and have been commonly used for controlling flow of fluids, including gases and liquid, for many years. A gate valve typically includes a valve body having a flow passageway therethrough. The body includes opposed, spaced apart, sealing surfaces which encircle the flow passageway. The gate member is slidably positioned between the sealing surfaces. One portion of the gate member includes an opening which, when aligned with the flow passageway, permits free flow of fluid through the valve. Another portion of the gate is a solid surface so that when such portion is positioned between the sealing surfaces flow through the valve is blocked.

In order to insure leakproof closure of a gate valve a leakproof sealing engagement must be effected between the gate member and the valve body sealing surfaces when the gate member is in closed position. In some types of gate valves the body sealing surfaces are metallic surfaces engaged by a metallic gate member. Such arrangement functions successfully only if the engaging surfaces are machined to an exacting tolerance. If warpage, distortion, or wear of the sealing surfaces or the gate member occurs the valve will leak. In order to compensate for machining tolerances, wear, and distortion, others have suggested incorporating a resilient member as a part of each body sealing surface. This has included, as an example, the provision of an annular groove in one or both of the body sealing surfaces with a resilient gasket positioned in each groove. Such arrangement results in improved effectiveness in obtaining sealing engagement with the gate member; however, some disadvantages are encountered. The resilient gasket, to be effective, must protrude beyond the body sealing surface.

Further, the resilient gasket must protrude beyond the body sealing surface a distance greater than that which it will have when in engagement with the gate member when the gate member is in closed position, otherwise no compressive force will exist to effectively seal with the gate member. For this reason, substantial frictional engagement occurs between the resilient gasket and the gate member as the gate member is moved into and out of the closed position. After frequent opening and closing of the gate member the wear on the resilient gasket will be such that sufficient resilient pressure is not exerted by the gasket to effect leakproof seal with the gate member and consequently the valve will leak.

This invention provides a means for effective sealing between the body sealing surfaces and the gate member of a gate valve.

More particularly, it is an object of this invention to provide improved means of effectively sealing between the body sealing surfaces and the gate member of a valve including improved means of maintaining resilient seal with the gate member when it is in closed position.

A still more particular object of this invention is to provide an improved means of effective sealing between the body sealing surface and the gate member of a gate valve including resilient gasket members and including means whereby the amount of compressive engagement with the gate member is selectively controlled by means externally of the valve body.

Another particular object of the invention is to provide improved means of effective sealing between the body sealing surfaces and the gate member of a gate valve including means controllable from the exterior of the valve body for eliminating or at least minimizing the frictional engagement of the gate with the body seating surface as the gate member is moved between opened and closed positions, and further, including means of increasing the resilient engagement with the gate member when the gate member is in closed position.

These and other objects will be fulfilled by the exemplary apparatus set forth in the description which follows, and in the claims, taken in conjunction with the attached drawings.

DESCRIPTION OF THE VIEWS

DETAILED DESCRIPTION

Figure 2:
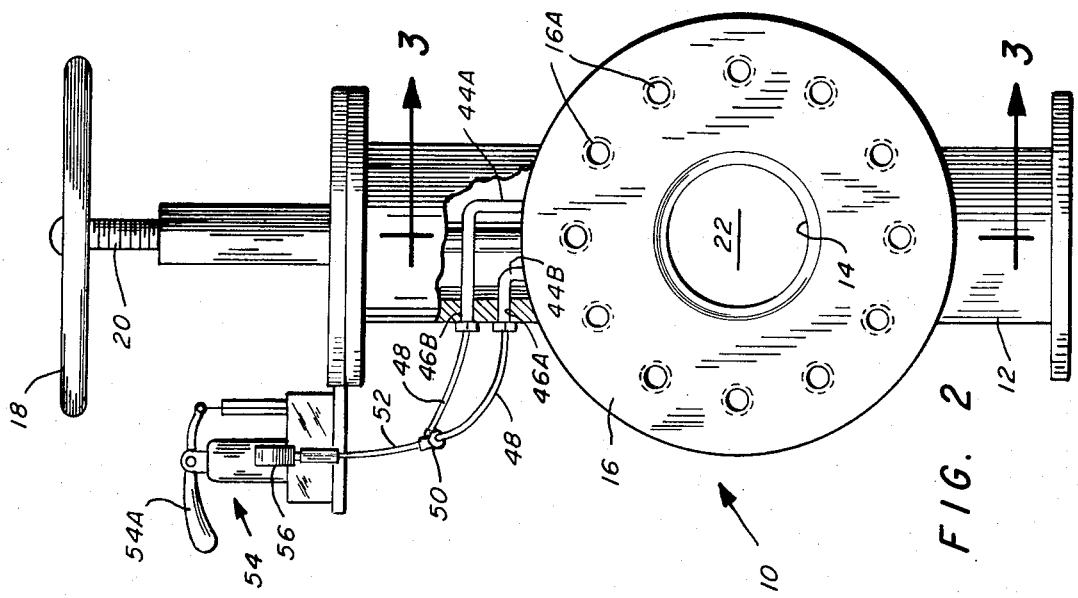
FIG. 2 is an end view of the valve of FIG. 1, partially cut away.
Figure 1:
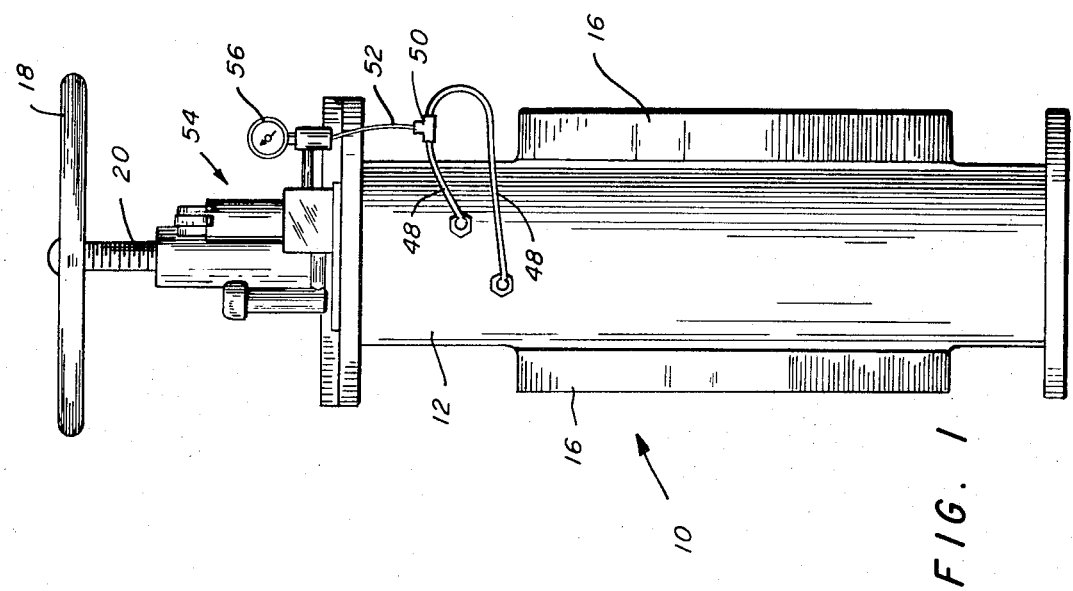
FIG. 1 is an external side view of a typical gate valve having, as an addition thereto, means externally of the valve for applying hydraulic pressure for controlling the compressive contact between the valve body sealing surfaces and the gate member.

Referring to the drawings and first to FIGS. 1 and 2, a typical gate valve is illustrated. It is understood that this invention is not related to the overall concept of a gate valve as such is well known in the art, but is related to improved means of effective sealing between the valve body sealing surfaces and the gate member. The invention may be applied to valves of many different designs and configurations and the appearance, size, shape or application of the valve is not directly related to the principles of this invention.

The valve as illustrated in FIGS. 1 and 2, and generally indicated by the numeral 10, includes a valve body 12 having a flow passageway 14 therethrough. The function of the valve is to open or close the passageway 14 so that when the valve is in the opened position, fluid either gases or liquids, may freely flow through the passageway 14, but when the passageway 14 is closed, the flow of fluid is blocked. Valve 10 includes, in the illustrated arrangement, flanges 16 as a means of attaching the valve to piping or other equipment, such as by means of both holes 16A. Some valves include other arrangements for attachment, including threaded members, wafer type arrangements in which the valve body is received between spaced flanges, and so forth. The invention is not related to the means whereby the valve is attached to piping or other equipment.

At the upper end of valve body 12 is a hand wheel 18 which is used to position the valve gate member between opened and closed positions. Hand wheel 18 is affixed to or cooperates with stem 20 for longitudinally positioning the gate member in the valve body. The specific arrangement for movement of the gate member is also not a part of the invention.

Figures 3, 4, 5A, 5B, 6, 7:
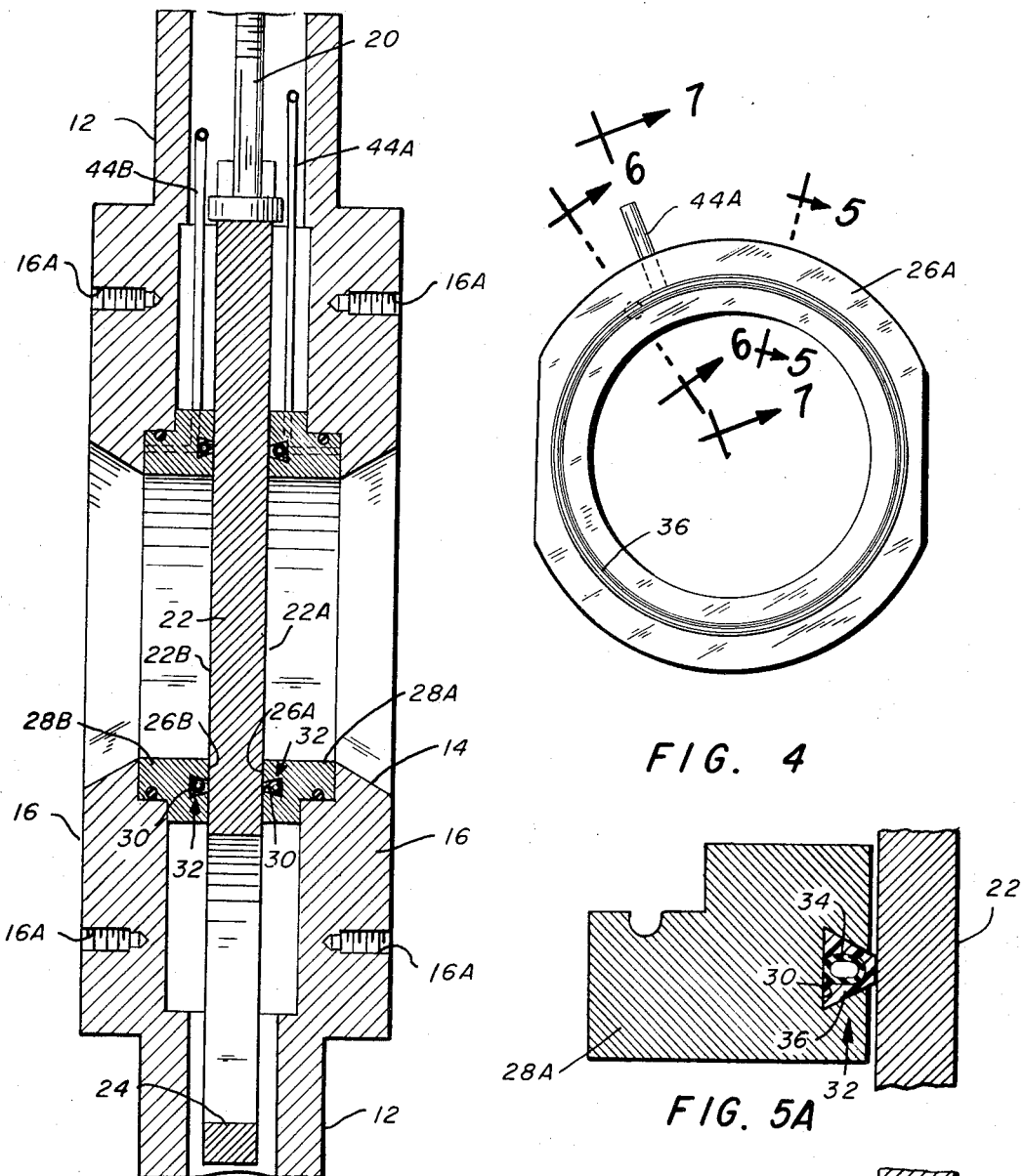
FIG. 3 is a partial cross-sectional view taken along the lines 3—3 of FIG. 2.
FIG. 4 is a view of a removable gate member seating element incorporating the expandable resilient sealing means of this invention.
FIG. 5A is an enlarged cross-sectional view taken along the line 5—5 of FIG. 4 showing the arrangement of the expandable resilient gasket means of this invention in expanded condition and further showing a small section of the gate member in cross-section illustrating the means of obtaining resilient contact between the gate member and the body seating surfaces.
FIG. 5B is a cross-sectional view as in 5A, but showing the gasket means in non-expanded condition.
FIG. 6 is a cross-sectional view taken along the line 6—6 of FIG. 4 showing one section of the seating ring, and the expandable gasket arrangement in the area wherein one end of the tubular portion of the gasket member is terminated.
FIG. 7 is a cross-sectional view taken along the line 7—7 of FIG. 4 showing means whereby fluid communication is provided to the expandable gasket member.

Referring to FIG. 3 the internal arrangement of the valve is better shown. Positioned within the valve body 12 is the gate member 22 which, as illustrated herein, is a flat plate member longitudinally positioned by stem 20. Gate member 20 has an opening 24 therein. When the opening 24 is aligned with passageway 14 in the valve body fluid may flow freely through the valve, but when the gate member is positioned, as shown in FIG. 3, fluid flow through the valve is blocked.

Gate member 22 includes opposed sealing surfaces 22A and 22B. To close the valve against fluid flow, the gate member sealing surfaces 22A and 22B must sealably engage body sealing surfaces 26A and 26B. In the illustrated arrangement the body sealing surfaces 26A and 26B are formed as a part of removable seat rings 28A and 28B. While the use of such removable seat rings is preferred such is not indispensable and the body sealing surfaces 26A and 26B may be formed as a part of the valve body itself.

The valve described to this point may be considered a representative type of gate valve well known in the art. The purpose of this invention is to provide improved means for effective leakproof engagement between the body sealing surfaces 26A and 26B and the gate member sealing surfaces 22A and 22B. Each body sealing surfaces 26A and 26B is provided with an annular groove 30. While not mandatory, groove 30 is preferably of a dove-tail configuration as illustrated. Positioned within each of the grooves 30 is an expandable resilient gasket member, generally indicated by the numeral 32.

The arrangement of such expandable gasket 32 is best understood by reference to FIGS. 5A and 5B. Positioned in groove 30 is a continuous length of resilient tubing 34. Tubing 34 may be of rubber, either natural or synthetic, or of a resilient plastic material. In one embodiment the tubing 34 may serve as the expandable gasket but in the preferred arrangement the groove 30 is filled with a bondable elastomer 36 which surrounds tubing 30 and completely fills the interior of the groove 30. Commercially available materials which may be used to provide elastomer 36 include Neoprene, Urathane, Viton and Teflon. Other types of bondable elastomer material which is non-reactive with the fluid, either liquid or gas, which the valve 10 is to handle, now exists and will likely be developed in the future.

The resilient tubing 34 is, as previously mentioned, preferably of a single length. Each seat ring 28A and 28B is provided with a pressure passageway which extends from the top of the seat ring to groove 30, as best shown in FIG. 7. The passageway includes a vertical portion 38A and a horizontal portion 38B. The first end 34A of the resilient tubing is received in the passageway 38A and is bonded to the passageway. The tubing runs completely around the annular groove 30 and, for a short distance, overlaps a portion adjacent the first end 34A. As best shown in FIG. 6 a horizontal terminating passageway 40 is formed in each of the seat rings. The horizontal passageway 40 receives the end 34B of tubing 34, the end portion being bonded in the passageway 40. Passageway 40 is closed with a plug 42 to close off the end 34B of the tubing.

To afford communication between the pressure passageways in the seat rings and the exterior of the valve body, tubular members 44A and 44B (see FIGS. 2 and 3) extend from the seat rings through openings 46A and 46B (see FIG. 2) in the valve body. Attached to openings 46A and 46B are hydraulic tubes 48 which extend to a T-fitting 50, and from thence by a single tube 52 to a hydraulic pump 54. By means of hydraulic pump 54 pressure may be applied by way of tubing 50, 48, and conduits 44A and 44B to the passageway 38A and 38B and thus to the interior of expandable tubing 34. A gauge 56 provides means of indicating the pressure applied to the interior of tubing 34.

OPERATION

Assuming the valve is in opened position and it is desired to move the gate member 22 to the closed position as shown in FIG. 3, handle 18 is operated to cause a linear displacement of the gate member 22 to the position of FIG. 3. At this juncture the operator will normally desire to assure positive sealing of the valve body with the gate member so as to prevent leakage of fluid through the valve. To effect such sealing the operator applies hydraulic pressure to the expandable gasket 32 and more particularly, to the resilient tubing 34. This may be accomplished in a variety of ways, such as from a pressurized container, or by the use of any sort of gas or hydraulic pressure. The means illustrated includes the use of hydraulic pump 54 which includes a handle 54A whereby the hydraulic pressure may be applied by manual operation.

When no hydraulic pressure is applied to the tubing 34 the expandable gasket 32 has the appearance as shown in FIG. 5B. This permits movement of gate member 22 without frictional engagement with the gasket member or, at least with a minimum frictional engagement. When fluid pressure is applied to tubing 34, it expands and forces the elastomer 36 out into firm, resilient engagement with the gate member 22 to afford complete sealing relationship of the valve body to the gate member. It can be seen that any wear, abrasion, distortion, or manufacturing tolerance deviations will be compensated for by the expanding resilient gasket so that highly effective sealing engagement is achieved. In addition, since the movement of the gate member between opened and closed positions does not result in attrition of the resilient seating surface the life of such seating surface is much greater than in valves in which the resilient gasket member is in continuous frictional engagement with the gate member as it is moved from one position to another.

While the invention has been described with a certain degree of particularity it is manifest that many changes may be made in the details of construction and the arrangement of components without departing from the spirit and scope of this disclosure. It is understood that the invention is not limited to the embodiment set forth herein but is limited only by the scope of the attached claim or claims, including the full range of equivalency to which each element or step thereof is entitled.

What is claimed:

1. In a valve having a body with a flow passageway therethrough, a gate member positionable in the body between an opened and a closed position, the gate member being arranged so that when in closed position fluid flow through the valve is blocked, the valve having external means of moving the gate member between opened and closed positions, the valve body including a body sealing surface, the gate member engaging said sealing surface when in closed position, improved means of effecting sealing between the body sealing surface and the gate member, wherein said body sealing surface has a continuous groove of trapazoidal dovetailed configuration encircling said body flow passageway and a pressure passageway in the body communicating said groove with the exterior of the valve body;

an elongated expandable gasket member positioned in said groove in said body sealing surface, the expandable gasket member having communication with said pressure passageway, said expandable gasket including a first resilient tubular portion received in said groove and a second elastomer portion surrounding said resilient tubular portion and being bonded to said body; and means externally of said body for applying fluid pressure by way of said pressure passageway to said expandable gasket member to expand said tubular portion and thereby said elastomer portion into engagement with said gate member.

2. Improved means of effecting sealing between a valve body sealing surface and a gate member according to claim 1 wherein said means externally of said body for applying fluid pressure by way of said pressure passageway to said expandable gasket member to expand said gasket member into engagement with said gate member includes a hand operated hydraulic pump supported to said valve body, said pump having a hydraulic fluid output to said body pressure passageway.

* * * * *